(12) United States Patent
Kobayashi et al.

(10) Patent No.: US 9,829,345 B2
(45) Date of Patent: Nov. 28, 2017

(54) ROTATION DETECTION APPARATUS

(71) Applicant: DENSO CORPORATION, Kariya, Aichi-pref. (JP)

(72) Inventors: Atsushi Kobayashi, Kariya (JP); Kenji Chikuan, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/110,759

(22) PCT Filed: Mar. 24, 2015

(86) PCT No.: PCT/JP2015/001679
§ 371 (c)(1),
(2) Date: Jul. 11, 2016

(87) PCT Pub. No.: WO2015/162852
PCT Pub. Date: Oct. 29, 2015

(65) Prior Publication Data
US 2016/0327411 A1    Nov. 10, 2016

(30) Foreign Application Priority Data
Apr. 23, 2014  (JP) .................. 2014-88970

(51) Int. Cl.
*G01B 7/30* (2006.01)
*G01R 33/09* (2006.01)
*G01D 5/16* (2006.01)
*G01D 5/245* (2006.01)

(52) U.S. Cl.
CPC ............. *G01D 5/16* (2013.01); *G01D 5/2457* (2013.01)

(58) Field of Classification Search
CPC ........................................................ G01B 7/30
USPC .................................................... 324/207.25
See application file for complete search history.

(56) References Cited

U.S. PATENT DOCUMENTS 7,253,613 B2 *  8/2007  Tokuhara ................ 324/207.25
2009/0058404 A1    3/2009  Kurumado

FOREIGN PATENT DOCUMENTS

| JP | S64-016923 A | 1/1989 |
| JP | H10-332725 A | 12/1998 |
| JP | 2008-008699 A | 1/2008 |
| JP | 4466355 B2 | 5/2010 |

* cited by examiner

*Primary Examiner* — Bot Ledynh
(74) *Attorney, Agent, or Firm* — Posz Law Group, PLC

(57) ABSTRACT

A rotation detection apparatus includes a signal detector and a determination circuit. The signal detector outputs a first signal and a second signal based on changes in respective resistance values of magnetoresistive element pairs. The first signal has a waveform corresponding to convexities and concavities of a rotor, while the second signal has a waveform differing in phase from the first signal. Upon receiving the first signal and second signal, the determination circuit compares each of the first signal and second signal against a binarization threshold value to generate a first binarized signal and a second binarized signal. The determination circuit permits output of the first binarized signal during one of a concavity period and a convexity period of the second binarized signal, and prohibits output of the first binarized signal during the other one of the concavity period and convexity period.

5 Claims, 4 Drawing Sheets

ROTATION DETECTION APPARATUS

CROSS REFERENCE TO RELATED APPLICATION

The present application is a U.S. national stage of International Application No. PCT/JP2015/001679 filed on Mar. 24, 2015 and is based on Japanese Patent Application No. 2014-88970 filed on Apr. 23, 2014, the disclosures of which are incorporated herein by reference.

TECHNICAL FIELD

The present disclosure relates to a rotation detection apparatus that detects the rotation of a gear-shaped rotor.

BACKGROUND ART

There is proposed a rotation detection apparatus to detect the rotation of a gear-shaped rotor, e.g., in Patent Literature 1. More specifically, the proposed rotation detection apparatus includes a plurality of magnetoresistive elements and a processing circuit. The processing circuit processes the output of each magnetoresistive element. Each magnetoresistive element configures a first magnetoresistive element pair and a second magnetoresistive element pair that are disposed to face the rotor and electrically form a half-bridge circuit.

The midpoint potential of each magnetoresistive element pair changes based on each tooth of the rotor. Thus, the processing circuit compares a differential output of the midpoint potential of each magnetoresistive element pair against a threshold value and generates a binarized signal by binarizing the differential output.

PRIOR ART LITERATURES

Patent Literature

Patent Literature 1: JP 2006-038827 A (JP 4466355 B2)

SUMMARY OF INVENTION

However, the midpoint potential of each magnetoresistive element pair in the above-mentioned conventional technology exhibits only an insignificant change according to the concavoconvex structure of the rotor; the threshold value needs to be set to be a value close the value of the midpoint potential of each magnetoresistive element pair. The threshold value may be exceeded, due to such as a scar on convexities of the rotor or noise inserted into the rotation detection apparatus, by the differential output of the midpoint potential of each magnetoresistive element pair. This may lead to an erroneous determination by the processing circuit, and an erroneous output of binarized signals by the rotation detection apparatus.

In view of the above circumstances, the present disclosure has an object to provide a rotation detection apparatus that is adapted to output a binarized signal based on the concavoconvex structure of a gear-shaped rotor and capable of preventing an erroneous binarized signal output.

To achieve the above object, according to an example of the present disclosure, a rotation detection apparatus is provided to include a signal detector and a determination circuit and detect rotation of a gear-shaped rotor having a concavoconvex structure in which convexities and concavities are alternately disposed in direction of rotation.

The signal detector, which includes magnetoresistive element pairs whose respective resistance values change during the rotation of the rotor, generates a first signal and a second signal based on changes in the respective resistance values of the magnetoresistive element pairs. The first signal has a waveform corresponding to the concavoconvex structure including the convexities and concavities of the rotor. The second signal has a waveform differing in phase from the first signal.

The determination circuit has a binarization threshold value to binarize the first signal and the second signal. Upon receiving the first signal and the second signal from the signal detector, the determination circuit compares each of the first signal and the second signal against the binarization threshold value to generate a first binarized signal by binarizing the first signal and a second binarized signal by binarizing the second signal. The determination circuit permits output of the first binarized signal during a first period, and prohibits output of the first binarized signal during a second period. The first period is one of a concavity period corresponding to the concavities and a convexity period corresponding to the convexities, in the second binarized signal, while the second period is the other one of the concavity period and the convexity period.

Consequently, even if the first signal crosses the binarization threshold value due to such as a scar or noise, the output of a binarized signal for the first signal is inhibited during either the concavity period or the convexity period. This can prevent an erroneous binarized signal output.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENTS

Figure 1:
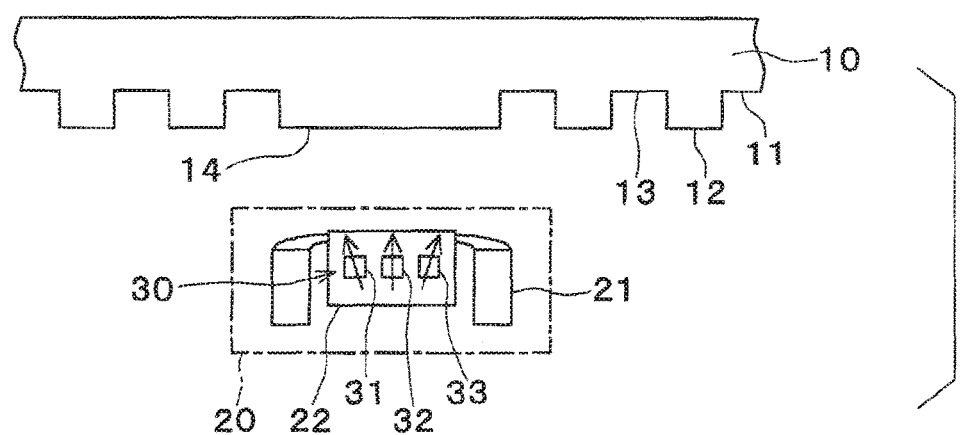
FIG. 1 is a diagram illustrating the positional relationship between a gear-shaped rotor and a rotation detection apparatus according to a first embodiment of the present disclosure.

Embodiments of the present disclosure will now be described with reference to the accompanying drawings. In the drawings related to the following description of the embodiments, elements identical or equivalent to each other are designated by the same reference numerals.

First Embodiment

A first embodiment of the present disclosure will now be described with referenced to the accompanying drawings. A rotation detection apparatus according to the present disclosure is used as a crank angle determination apparatus for an internal combustion engine, for example. As in FIG. 1, the rotation detection apparatus 20 is disposed to face an outer circumference 11 of a gear-shaped rotor 10 that is fastened to a crankshaft of the engine, that is, the internal combustion engine. The rotation detection apparatus 20 detects the rotation or rotational mode (e.g., concavoconvex structure)

of the rotor 10. In FIG. 1, a part of the outer circumference 11 of the rotor 10 is illustrated to be straightened for the sake of brevity. The same applies to FIG. 3.

The outer circumference 11 of the rotor 10 is structured so that a convexity 12 and a concavity 13 are alternately disposed in the direction of rotation (this structure may be referred to as the concavoconvex structure of the rotor). The rotor is configured so that one of a plurality of convexities 12 is shaped as a long convexity 14, which is longer in the rotation direction than the other convexities. In the first embodiment, the rotor 10 has one long convexity 14. The long convexity 14 represents the rotational reference position of the rotor 10, that is, the reference crank angle.

The rotation detection apparatus 20 includes a cylindrical bias magnet 21 and a sensor chip 22. The sensor chip 22 is disposed at a predetermined position relative to the bias magnet 21. The bias magnet 21 increases the magnetic field detection sensitivity of the rotation detection apparatus 20 by a predetermined amount. The sensor chip 22 is placed in a cavity of the bias magnet 21.

The sensor chip 22 includes a signal detector 30 (referred to also as the detection portion 30). When the rotor 10 rotates, the signal detector 30 outputs a detection signal based on the position of the outer circumference 11, that is, the crank angle. The signal detector 30 includes three magnetoresistive element pairs, namely, a first magnetoresistive element pair 31, a second magnetoresistive element pair 32, and a third magnetoresistive element pair 31. The resistance value of each magnetoresistive element pair changes when the rotor 10 rotates.

As viewed in the direction of rotation of the rotor 10, the second magnetoresistive element pair 32 is disposed between the first magnetoresistive element pair 31 and the third magnetoresistive element pair 33. In short, the second magnetoresistive element pair 32 is sandwiched between the first magnetoresistive element pair 31 and the third magnetoresistive element pair 33. A bias magnetic field generated along the central axis of the bias magnet 21 is applied to the second magnetoresistive element pair 32. Meanwhile, a bias magnetic field generated around the ends of the bias magnet 21 is applied to the first magnetoresistive element pair 31 and the third magnetoresistive element pair 33.

Figure 2:
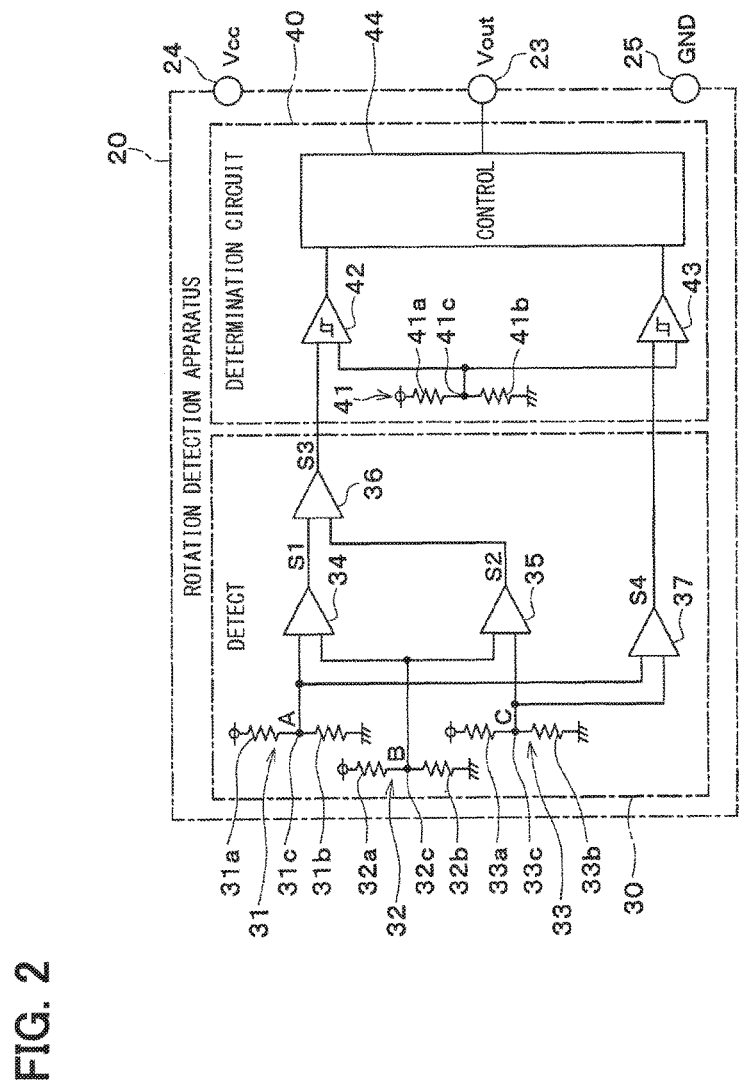
FIG. 2 is a diagram illustrating a circuit configuration of the rotation detection apparatus illustrated in FIG. 1.

Each magnetoresistive element pair 31-33 is configured as a half-bridge circuit. More specifically, as in FIG. 2, the first magnetoresistive element pair 31 is formed of two magnetoresistive elements 31a, 31b, which are connected in series between a power supply (Vcc) and a ground (GND). The first magnetoresistive element pair 31 detects a change in the resistance value when the rotor 10 rotates to let each magnetoresistive element 31a, 31b be affected by a magnetic field. Based on the change in the resistance value, the first magnetoresistive element pair 31 outputs a voltage at a midpoint 31c between the magnetoresistive elements 31a, 31b as a waveform signal.

The second magnetoresistive element pair 32 is formed of two magnetoresistive elements 32a, 32b, which are connected in series between a power supply (Vcc) and a ground (GND). A change in the resistance value is caused when the rotor 10 rotates to let each magnetoresistive element 32a, 32b be affected by a magnetic field. Based on the change in the resistance value, the second magnetoresistive element pair 32 outputs a voltage at a midpoint 32c between the magnetoresistive elements 32a, 32b as a waveform signal.

The third magnetoresistive element pair 33 is formed of two magnetoresistive elements 33a, 33b, which are connected in series between a power supply (Vcc) and a ground (GND). A change in the resistance value is caused when the rotor 10 rotates to let each magnetoresistive element 32a, 32b be affected by a magnetic field. Based on the change in the resistance value, the third magnetoresistive element pair 33 outputs a voltage at a midpoint 33c between the magnetoresistive elements 33a, 33b as a waveform signal.

In addition to the magnetoresistive element pairs 31-33 the signal detector 30 includes first to fourth operational amplifiers 34-37. The first operational amplifier 34 is a differential amplifier. In cases where the midpoint voltage at the midpoint 31c of the first magnetoresistive element pair 31 is defined as A and the midpoint voltage at the midpoint 32c of the second magnetoresistive element pair 32 is defined as B, the first operational amplifier 34 computes A−B and outputs the result of computation as S1. The second operational amplifier 35 is a differential amplifier. In cases where the midpoint voltage at the midpoint 33c of the third magnetoresistive element pair 33 is defined as C, the second operational amplifier 35 computes B−C and outputs the result of computation as S2.

The third operational amplifier 36 is a differential amplifier that inputs S1 (=A−B) from the first operational amplifier 34, inputs S2 (=B−C) from the second operational amplifier 35, computes S1−S2, and outputs the result of computation as S3 (=(A−B)−(B−C)). Signal S3 is a first signal, which is a waveform signal corresponding to the concavoconvex structure of convexities 12 and concavities 13 of the rotor 10. For example, the first signal S3 is a waveform signal whose amplitude is maximized at an edge where a concavity 13 of the rotor 10 switches to a convexity 12 and is minimized at an edge where a convexity 12 switches to a concavity 13.

The fourth operational amplifier 37 is a differential amplifier that inputs midpoint potential A from the midpoint 31c of the first magnetoresistive element pair 31, inputs midpoint potential C from the midpoint 33c of the third magnetoresistive element pair 31, computes A−C, and outputs the result of computation as S4. Signal S4 is a second signal, which is a waveform signal differing in phase from the first signal S3. For example, the second signal S4 is a waveform signal whose amplitude is maximized at the center in the direction of rotation of a convexity 12, which is a tooth of the rotor 10, and is minimized at the center in the direction of rotation of a concavity 13. The first signal is referred to also as the main signal or the primary signal. The second signal is referred to also as the subordinate signal or the secondary signal.

As described, the signal detector 30 generates and acquires the first signal S3 (=(A−B)−(B−C)) and the second signal S4 (=A−C) from the outputs of the magnetoresistive element pairs 31-33.

The rotation detection apparatus 20 also includes a determination circuit 40. The determination circuit 40 generates an output signal based on the rotation or concavoconvex structure of the rotor 10, which are detected by the signal detector 30. The determination circuit 40 may be formed in the aforementioned sensor chip 22 or in a separate semiconductor chip (unshown).

The determination circuit 40 includes a threshold value generator 41, a first comparator 42, a second comparator 43, and a controller 44. The threshold value generator 41 is formed of two resistors 41a, 41b, which are connected in series between a power supply (Vcc) and a ground (GND). A potential at a midpoint 41c between the resistors 41a, 41b is used as a binarization threshold value. The binarization threshold value is used as a threshold value for binarizing the first signal S3 and the second signal S4.

The first comparator 42 inputs the first signal S3 from the third operational amplifier 36 of the signal detector 30, inputs the binarization threshold value from the threshold value generator 41, compares the first signal S3 against the binarization threshold value, which is a threshold value (TH) for binarization, and generates a binarized signal by binarizing the first signal S3.

The second comparator 43 inputs the second signal S4 from the fourth operational amplifier 37 of the signal detector 30, inputs the binarization threshold value from the threshold value generator 41, compares the second signal S4 against the binarization threshold value, and binarizes the second signal S4. When two binarized signals obtained by binarizing the first signal S3 and the second signal S4 are to be distinguished from each other, the binarized signal obtained by binarizing the first signal S3 is referred to as the first binarized signal, and the binarized signal obtained by binarizing the second signal S4 is referred to as the second binarized signal. When the term "binarized signal" is used subsequently, it signifies the binarized signal obtained by binarizing the first signal S3 (namely, the first binarized signal).

The first comparator 42 and the second comparator 43 each have hysteresis characteristics. The present embodiment is configured so that the binarization threshold value takes a first value when the first signal S3 is smaller than the binarization threshold value and takes a second value, which is smaller than the first value, when the first signal S3 is greater than the binarization threshold value. In short, the first comparator 42 and the second comparator 43 change the binarization threshold value to the first value or the second value depending on the first signal S3. Thus, the first signal S3 is unlikely to exceed the binarization threshold value even if noise or other unwanted signal is inserted into the first signal S3 corresponding to the long convexity 14 of the rotor 10. This results in increased noise immunity.

The controller 44 is a control circuit that inputs a binarized signal from the first comparator 42, inputs a second binarized signal S4 from the second comparator 43, and controls based on the second binarized signal S4 to permit or prohibit the output of the binarized signal. The controller 44 operates so that the binarized signal whose output is permitted is outputted to an external instrument (unshown) through an output terminal 23 (Vout). The controller 44 may be supplied as computer that includes a common CPU, RAM, and ROM. In such an instance, the CPU may use software to implement a control function by executing a program recorded in the RAM or ROM. Alternatively, the controller 44 may include another hardware component and use only the hardware component to implement a part or the whole of the control function.

An overall configuration of the rotation detection apparatus 20 according to the present embodiment has been described above. The rotation detection apparatus 20 includes a power supply terminal 24 (Vcc) and a ground terminal 25 (GND), which are connected to the external instrument, and receives the supply of electrical power from the external instrument through the power supply terminal 24 (Vcc) and the ground terminal 25 (GND).

Figure 3:
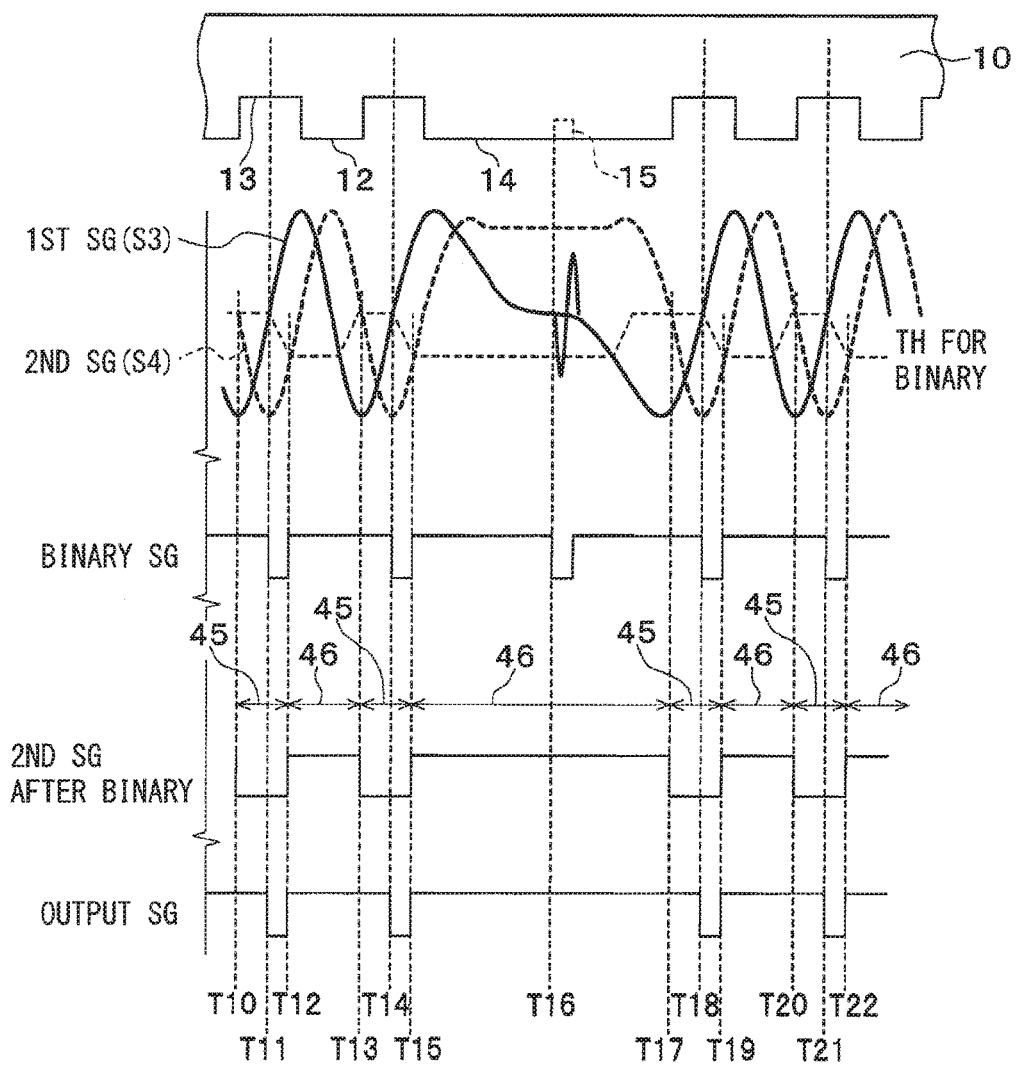
FIG. 3 is a time-based diagram illustrating an operation of the rotation detection apparatus.

Operations of the rotation detection apparatus 20 will now be described, First of all, when the rotor 10 rotates, the signal detector 30 acquires the first signal S3 and the second signal S4 based on a change in the gap between the signal detector 30 and the outer circumference 11 of the rotor 10, as in FIG. 3.

The first signal S3 is a waveform signal that exceeds the binarization threshold value at the center in the direction of rotation of a concavity 13 of the rotor 10. Meanwhile, the second signal S4 is a waveform signal differing in phase from the first signal S3, or more specifically, a waveform signal whose amplitude is maximized at the center in the direction of rotation of a convexity 12 of the rotor 10.

The first signal S3 acquired by the signal detector 30 is then compared against the binarization threshold value in the first comparator 42 of the determination circuit 40. The first comparator 42 generates, for example, a Lo binarized signal if the amplitude of the first signal S3 is greater than the binarization threshold value, or generates, for example, a Hi binarized signal if the amplitude of the first signal S3 is smaller than the binarization threshold value. The generated binarized signal is then outputted to the controller 44.

In the present embodiment, the pulse width of the binarized signal is controlled by the controller 44 to a predetermined value. This process is performed in compliance with a request from the external instrument. The pulse width of the binarized signal is therefore smaller than a period during which the amplitude of the first signal S3 is greater than the binarization threshold value. Obviously, this process need not be performed by the controller 44 if no request is issued from the external instrument.

Further, the second signal S4 acquired by the signal detector 30 is compared against the binarization threshold value in the second comparator 43 of the determination circuit 40. The second comparator 43 generates, for example, a Hi signal if the amplitude of the second signal S4 is greater than the binarization threshold value, or generates, for example, a Lo signal if the amplitude of the second signal S4 is smaller than the binarization threshold value. The generated signal is then outputted to the controller 44.

As described, when the rotor 10 rotates, the first signal S3, the second signal S4, the binarized signal, and the second binarized signal S4 are generated as needed, and the binarized signal and the second binarized signal S4 are inputted to the determination circuit 40. The determination circuit 40 then performs a process for outputting the binarized signal to the external instrument.

More specifically, the determination circuit 40 performs the above-mentioned process as described below. First of all, at time T10, as the amplitude of the first signal S3 is smaller than the binarization threshold value, the binarized signal is Hi. Further, as the amplitude of the second signal S4 is smaller than the binarization threshold value, the second binarized signal S4 is Lo.

At time T11, the amplitude of the first signal S3 is greater than the binarization threshold value, the binarized signal is Lo. Further, as the binarization threshold value is exceeded by the amplitude of the first signal S3, the binarization threshold value decreases. In short, the binarization threshold value switches to the second value. Time T11 corresponds to the center in the direction of rotation of a concavity 13 of the rotor 10.

Under normal conditions, the pulse width of the binarized signal corresponds to the period between time T11 and the time at which the amplitude of the first signal S3 becomes smaller than the binarization threshold value. In the present embodiment, the controller 44 controls the pulse width of the binarized signal so that the pulse width of the binarized signal is smaller than a normal pulse width in compliance with a request from the external instrument. The Lo binarized signal therefore reverts to the Hi level state more quickly than under normal conditions.

At time T12, as the amplitude of the second signal S4 is greater than the binarization threshold value, the second binarized signal S4 is Hi. The period between time T12 and time T10, at which the second signal S4 is Lo, corresponds to a concavity 13 of the rotor 10. The period corresponding to the concavity 13 is referred to as the concavity period 45. During the concavity period 45, the output of the binarized signal is permitted. The controller 44 therefore outputs the binarized signal to the external instrument during the concavity period 45. Subsequently, when the amplitude of the first signal S3 becomes smaller than the binarization threshold value, the binarization threshold value reverts to the first value.

At time T13, as the amplitude of the second signal S4 is smaller than the binarization threshold value, the second binarized signal S4 is Lo. The period between time T13 and time T12, at which the second signal S4 is Hi, corresponds to a convexity 12 of the rotor 10. The period corresponding to the convexity 12 is referred to as the convexity period 46. During the convexity period 46, the output of the binarized signal is prohibited. The controller 44 therefore does not output the binarized signal during the convexity period 46.

At time T14, the amplitude of the first signal S3 is greater than the binarization threshold value, as is the case with time T11. Thus, the binarized signal is Lo at time T14. Further, the binarization threshold value switches to the second value, which is smaller than the first value.

At time T15, the amplitude of the second signal S4 is greater than the binarization threshold value, as is the case with time T12. Thus, the second binarized signal S4 is Hi at time T15. The period between time T13 and time T15 corresponds to the concavity period 45. The convexity period 46 begins at time T15.

Subsequently, the long convexity 14 of the rotor 10 passes above the signal detector 30. If the surface of the long convexity 14 has a scar 15, for example, the first signal S3 includes a noise component based on the scar 15 as indicated in FIG. 3. At time T16, the amplitude of the first signal S3 therefore becomes smaller than the binarization threshold value. Thus, the binarized signal is Lo. However, time T16 is included in the convexity period 46, that is, the period during which the output of the binarized signal is prohibited. Consequently, the controller 44 does not output the binarized signal to the external instrument.

At time T17, that is, when the long convexity 14 of the rotor 10 passes through the signal detector 30, the amplitude of the second signal S4 becomes smaller than the binarization threshold value. Thus, the second binarized signal is Lo. The period between time T15 and time T17 corresponds to the convexity period 46.

Operations performed subsequently at time T18, time T19, time T20, time T21, and time T22 are the same as those performed at time T11, time T12, time T13, time T14, and time T15, respectively.

As described, the present embodiment is characterized in that when the binarized signal is to be outputted to the external instrument, the determination circuit 40 permits the output of the binarized signal during the concavity period 45 and prohibits the output of the binarized signal during the convexity period 46. That is, although the generated binarized signal is outputted as is under normal conditions, the determination circuit 40 according to the present embodiment is provided with an output stoppage period during which the output of the binarized signal is prohibited. Therefore, even if the first signal S3 crosses the binarization threshold value due to such as noise or a scar 15 on the rotor 10, the output of the binarized signal is prohibited during the convexity period 46. This can prevent an erroneous output of the binarized signal.

Further, the present embodiment prohibits the output of the binarized signal during the convexity period 46 corresponding to the long convexity 14 of the rotor 10. An erroneous output of the binarized signal can therefore be avoided particularly during the detection of the rotation or concavoconvex structure of the rotor 10 having the long convexity 14, which is likely to have a scar 15.

Moreover, as the erroneous output of the binarized signal can be avoided, no limitation is imposed on an air gap, that is, the distance between the rotor 10 and the signal detector 30. This can improve the mountability of the rotation detection apparatus 20 with respect to the rotor 10.

Second Embodiment

Figure 4:
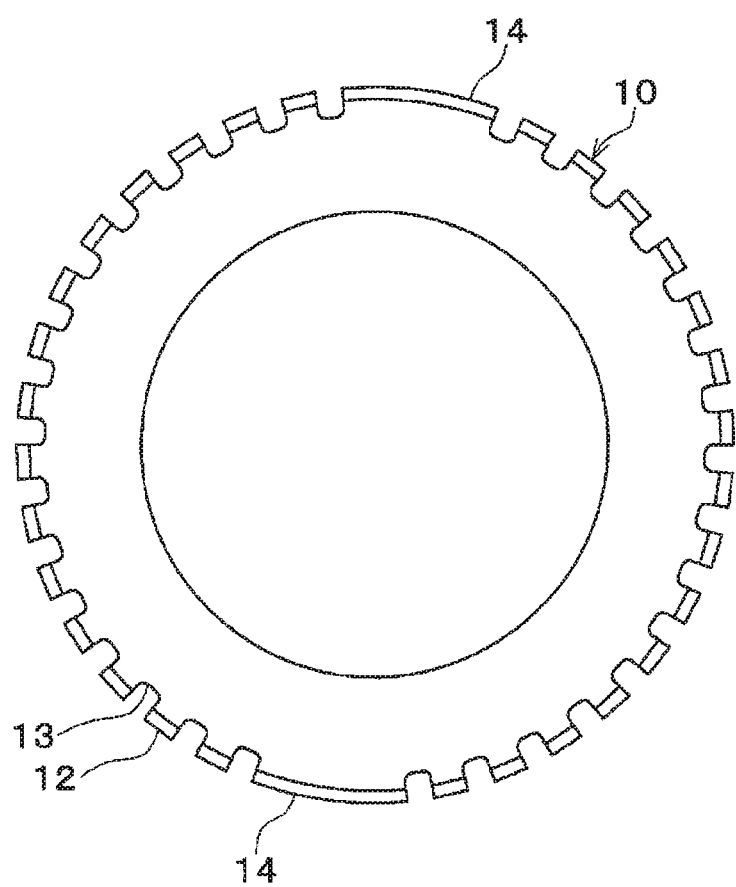
FIG. 4 is a plan view illustrating a rotor according to a second embodiment.

A second embodiment will now be described relative to a difference from the first embodiment. As in FIG. 4, the rotor 10 has two long convexities 14. The rotation detection apparatus 20 is capable of detecting the rotation or concavoconvex structure of the rotor 10 having the two long convexities 14.

Other Embodiments

The configuration of the rotation detection apparatus 20 described in conjunction with each of the foregoing embodiments is merely an example. The configuration of the rotation detection apparatus 20 is not limited to those described above. Other configurations may be formed to implement the present disclosure.

For example, the number of magnetoresistive element pairs included in the signal detector 30 is not limited to three. If two magnetoresistive element pairs, namely, the first magnetoresistive element pair 31 and the third magnetoresistive element pair 33, are included in the signal detector 30, the first signal S3 may be a derivative of A–C, and the second signal S4 may be A–C. Alternatively, five magnetoresistive element pairs may be included in the signal detector 30. In this instance, when the midpoint potentials of the magnetoresistive element pairs are A, B, C, D, and E, respectively, the first signal S3 may be (A–C)+(B–C)–(C–D)–(C–E), and the second signal S4 may be (A–E) or (B–E). As described, the number of magnetoresistive element pairs may be changed as needed.

In the foregoing embodiments, the controller 44 prohibits the output of the binarized signal during the convexity period 46. However, an alternative is to permit the output of the binarized signal during the convexity period 46 and prohibit the output of the binarized signal during the concavity period 45.

In the foregoing embodiments, the rotor 10 has one or two long convexities 14. However, such rotor configurations are merely exemplary. For example, all the convexities 12 to be measured may alternatively be formed as long convexities 14. That is, the rotor 10 may be measured when any of its convexities 12 are formed as long convexities 14, which are longer in the direction of rotation than the other convexities 12. Meanwhile, the rotor 10 may be measured when its concavities 13 are formed as long concavities that are longer in the direction of rotation than the convexities 12. When the rotor 10 is to be measured when its concavities 13 are longer than the convexities 12, the output of the binarized signal may be prohibited during the concavity period 45.

In the foregoing embodiments, the comparators 42, 43 of the determination circuit 40 have hysteresis characteristics. Alternatively, however, the comparators 42, 43 may be configured so that the binarization threshold value does not have hysteresis characteristics.

In the foregoing embodiments, the rotor 10 is fastened to a crankshaft of an engine that is an internal combustion engine. However, the rotation detection apparatus 20 is also applicable to other than the internal combustion engine.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A rotation detection apparatus that detects rotation of a gear-shaped rotor having a concavoconvex structure in which a plurality of convexities and a plurality of concavities are alternately disposed in a direction of rotation, the rotation detection apparatus comprising:

a signal detector that includes a plurality of magnetoresistive element pairs whose respective resistance values change during the rotation of the rotor, the signal detector generating a first signal and a second signal based on changes in the respective resistance values of the magnetoresistive element pairs, the first signal having a waveform corresponding to the concavoconvex structure including the convexities and concavities of the rotor, the second signal having a waveform differing in phase from the first signal; and a determination circuit having a binarization threshold value to binarize the first signal and the second signal, the determination circuit that receives the first signal and the second signal from the signal detector, compares the first signal against the binarization threshold value to generate a first binarized signal by binarizing the first signal, compares the second signal against the binarization threshold value to generate a second binarized signal by binarizing the second signal, permits output of the first binarized signal during a first period, and prohibits output of the first binarized signal during a second period, the first period being one of two periods, the two periods being (i) a concavity period of the second binarized signal corresponding to the concavities and (ii) a convexity period of the second binarized signal corresponding to the convexities, the second period being different one of the two periods, the second period being different from the first period.

2. The rotation detection apparatus according to claim 1, wherein the determination circuit permits the output of the first binarized signal during the convexity period and prohibits the output of the first binarized signal during the concavity period.

3. The rotation detection apparatus according to claim 1, wherein the determination circuit permits the output of the first binarized signal during the concavity period and prohibits the output of the first binarized signal during the convexity period.

4. The rotation detection apparatus according to claim 1, wherein:

each of the magnetoresistive element pairs forms a half-bridge circuit;

the magnetoresistive element pairs include a first magnetoresistive element pair, a second magnetoresistive element pair, and a third magnetoresistive element pair;

the second magnetoresistive element pair is positioned, in the direction of rotation of the rotor, between the first magnetoresistive element pair and the third magnetoresistive element pair; and in cases where a midpoint potential of the first magnetoresistive element pair is A, a midpoint potential of the second magnetoresistive element pair is B, and a midpoint potential of the third magnetoresistive element pair is C, the signal detector acquires $\{(A-B)-(B-C)\}$ as the first signal and acquires $(A-C)$ as the second signal.

5. The rotation detection apparatus according to claim 1, wherein the convexities in the rotor include a long convexity and other convexities other than the long convexity, the long convexity being longer in the direction of rotation than the other convexities.

\* \* \* \* \*